United States Patent [19]

O'Neal et al.

[11] 4,063,331
[45] Dec. 20, 1977

[54] GUT PULLER

[75] Inventors: Leo O'Neal; Wayne H. Stark; Richard B. Hoium, all of Albert Lea, Minn.

[73] Assignee: Wilson Foods Corporation, Oklahoma City, Okla.

[21] Appl. No.: 689,080

[22] Filed: May 24, 1976

[51] Int. Cl.² ............................................. A22C 17/14
[52] U.S. Cl. ........................................ 17/45; 17/1 R; 17/24; 17/43
[58] Field of Search ...................... 17/43, 1 R, 24, 45, 17/52, 34

[56] References Cited

U.S. PATENT DOCUMENTS

| 2,239,199 | 4/1941 | Pulley | 17/43 |
| 2,307,361 | 1/1943 | Demarest et al. | 17/34 X |
| 3,054,545 | 9/1962 | Karius | 17/34 |
| 3,105,267 | 10/1963 | Soderman | 17/43 X |
| 3,209,397 | 10/1965 | Biderman | 17/34 |
| 3,266,911 | 8/1966 | Clement | 17/45 X |
| 3,500,743 | 3/1970 | Cameron | 17/34 X |
| 3,868,747 | 3/1975 | Townsend et al. | 17/34 |
| 3,882,571 | 5/1975 | Evers et al. | 17/43 |
| 3,949,447 | 4/1976 | Evers et al. | 17/43 X |

FOREIGN PATENT DOCUMENTS

| 773,469 | 11/1934 | France | 17/43 |
| 858,937 | 1/1976 | United Kingdom | 17/43 |

Primary Examiner—David H. Brown

[57] ABSTRACT

A method and apparatus for pulling a strand of intestine from a convoluted intestine, such as removed from an animal, and for removing the ruffle fat from the intestine by severing, is disclosed herein. The leading end of the convoluted intestine is initially separated from the remaining bulk of convoluted intestine for insertion into the pulling apparatus which includes a work surface inclined downwardly from an entrance end to an exit end. Between the exit end and the entrance end are a pair of opposed gripping belts, each mounted parallel to the work surface and defining a path between them along which the intestine strand may travel as it is compressively engaged on each side by the belts. As the belts are driven, the remaining bulk of convoluted intestine is restrained and the belts progressively pull the strand of intestine away from the convoluted bulk. Ahead of the gripping belts at the entrance end of the apparatus is a circular knife blade which is mounted in a plane parallel to the work surface and at an elevation above the work surface that permits a strand of intestine to be pulled beneath it while the ruffle fat attached to the upper circumferential portion of the strand is held against, and above, the circular cutting knife to sever the ruffle fat from the strand. The circular knife and one gripping belt are each movable away from (1) an engaging position adjacent the strand pull path to (2) a clearance position spaced from the path to enable the leading end of the intestine to be manually placed in the path. Pivotally mounted above the work surface at the exit end of the apparatus is a baffle plate movable by positioning means into the discharge trajectory of the intestine strand to deflect the intestine strand so as to control the trajectory and disposition of the strand as it passes from the exit end of the apparatus.

28 Claims, 7 Drawing Figures

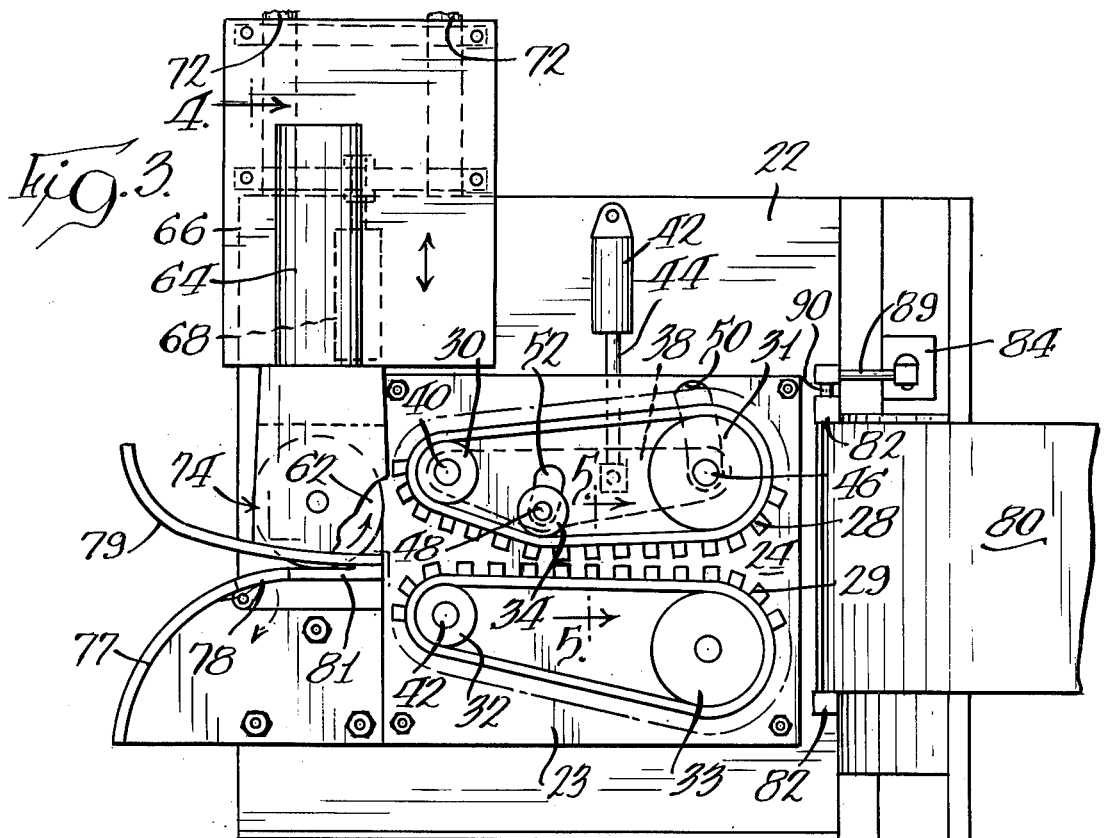
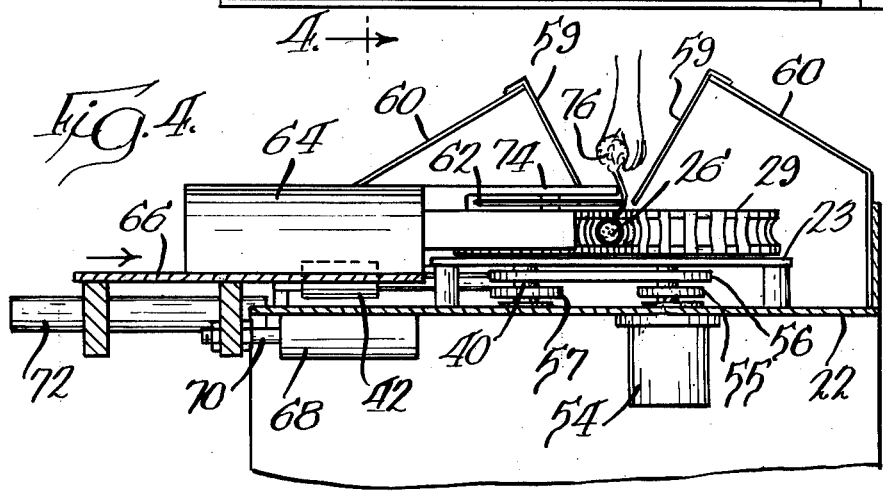
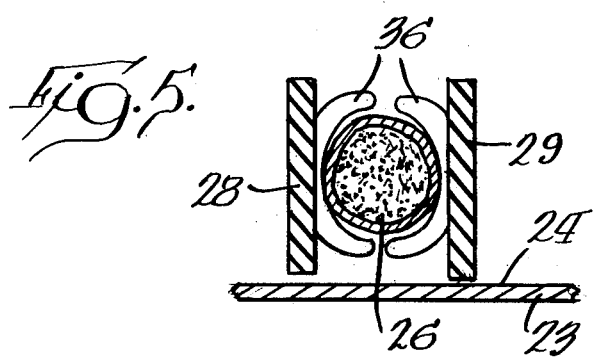

GUT PULLER

BACKGROUND OF THE INVENTION

The tubular wall of an animal small intestine, preferably that of a hog, is used as sausage casing for polish sausage and the like. Typically, hog intestines are processed to remove the offal contents of the small intestine and to provide a length of cleaned tubular intestine strand.

The present invention relates to a method and apparatus for separating a convoluted animal intestine by pulling a long strand from the convoluted bulk of intestine. The present invention is particularly suitable for pulling the small intestine of a hog.

When the intestines of an animal are removed, the intestines are found to be grouped into a coiled bulk of convoluted large intestine strand joined to a coiled bulk of convoluted small intestine strand. Conventionally, the pulling of intestines has been done manually. For example, a workman removes all of the guts from a slaughtered hog as it is being transported along a production line in an inverted position. The convoluted small intestine is separated from the convoluted large intestine on one end and from the stomach on the other end. The small intestine is in the coiled, or convoluted state and covered with a fatty membrane or ruffle fat which is attached to a portion of the circumference of the individual strand of intestine making up the convoluted coil. The small intestine, with ruffle fat attached, is known as the casing set. Conventionally, the ruffle fat must be cut away by workmen and the coiled intestine must be manually pulled and stretched in individual strokes to an average uncoiled length of 70 feet for a hog small intestine. The pulling operation is a tedious and time consuming task. It has been determined, that in one meat butchering plant, seven men are required to pull about 65 sets of hog small intestines per day.

There is a need for a method and apparatus for pulling the intestines rapidly and in such a manner so as to not damage the wall of the strand of intestine being pulled. Further, there is a need for a method and apparatus for separating or severing the ruffle fat from the small intestine. There is also a need for a method or apparatus of directing the pulled strand of intestine to the next work station or processing conveyor in a rapid manner.

SUMMARY OF THE INVENTION

This invention contemplates the pulling of the intestine of an animal in one long strand. The casing set, consisting of the small intestine with attached ruffle fat, is manually separated from the stomach and large intestine. A leading end of the small intestine is separated from the convoluted, or coiled bulk, of the small intestine and is also separated from the attached ruffle fat. The loose end is then compressively engaged on opposite sides between gripping members. The remaining bulk of the convoluted intestine with attached ruffle fat, or casing set, is held and restrained. The leading end is then progressively pulled between the gripping members to pull one long strand of intestine.

The apparatus for pulling a long strand of intestine from a casing set comprises a downwardly inclined work surface between an entrance end and an exit end. A pair of opposed gripping belts are mounted on, and parallel to, the working surface and define a path between them along which an intestine strand may travel. Each gripping belt comprises an articulated chain link array of segments of gripping fingers. Each gripping finger is arcuate or crescent-shaped to contact a circumferential portion of a generally round strand of intestine. Each gripping belt is disposed about a drive sprocket and an idler sprocket. One gripping belt is stationary and is oriented in a fixed position presenting a straight segment of gripping belt adjacent, and parallel to, the path of intestine strand travel. The other gripping belt is mounted for movement between (1) a clearance position, spaced from the path to enable the leading end of the intestine strand to be manually placed in the path, and (2) a gripping position, adjacent the path wherein the gripping belts apply a compressive gripping force to the portion of the intestine strand disposed therebetween. The movable gripping belt has a fixed drive sprocket and a pivotally movable plate on which is mounted the idler sprocket and an intermediate roller. The intermediate roller is mounted between the drive sprocket and idler sprocket on the plate and bears against the driven inner surface of the one movable gripping belt to deflect a portion of the gripping belt to present a straight segment adjacent, and parallel to, the path along which the intestine strand travels.

At the entrance end of the apparatus, and ahead of the gripping belts, is a circular cutting knife which is disposed parallel to, and above, the intestine strand path. The circular knife is mounted for movement between (1) a cutting position above the path and (2) a loading position spaced away from the path to allow placement of the leading end of the strand of intestine. When the leading end of the strand of intestine is placed on the work surface in the path between the gripping belts, the movable gripping belt is pivoted from the clearance, or loading position, to the engaging, or gripping, position while the cutting knife is moved from the loading position to the engaged cutting position. When actuated, the gripping belts are rotated to draw the strand of intestine away from the remaining casing set being restrained at the entrance end of the machine. The casing set is held and restrained by the ruffle fat with the major portion of the ruffle fat held above, and adjacent to, the cutting knife. As the strand of intestine is pulled past the knife, a thin portion of the ruffle fat adjacent the knife extends from the ruffle fat portion held above the knife to the intestine strand below the knife. This thin portion is severed as the strand progresses past the knife.

When the gripping belts are actuated, the leading end of the intestine strand is run through the gripping belts and is discharged from the exit end of the apparatus. A baffle plate is pivotally mounted above the working surface over the intestine strand path. The baffle plate is movable into the trajectory of the intestine strand as the intestine strand is forced over the exit end of the apparatus. This deflects the strand into proper position for properly impinging upon a transfer collection conveyor.

Numerous other advantages and features of the present invention will become readily apparent from the following detailed description of the invention and of one embodiment thereof, from the claims, and from the accompanying drawings in which each and every detail shown is fully and completely disclosed as part of the specification.

BRIEF DESCRIPTION OF THE DRAWINGS

In the accompanying drawings forming part of the specification, and in which like numerals are used to designate like parts throughout the same.

FIG. 3 is a top plan view of the apparatus shown in FIGS. 1 and 2;

FIG. 4 is a cross-section view taken generally along plane 4—4 of FIG. 3;

FIG. 5 is an enlarged cross-section view taken generally along plane 5—5 of FIG. 3, and showing an intestine strand between the gripping belts of the apparatus;

DESCRIPTION OF THE PREFERRED EMBODIMENT

Figure 1:
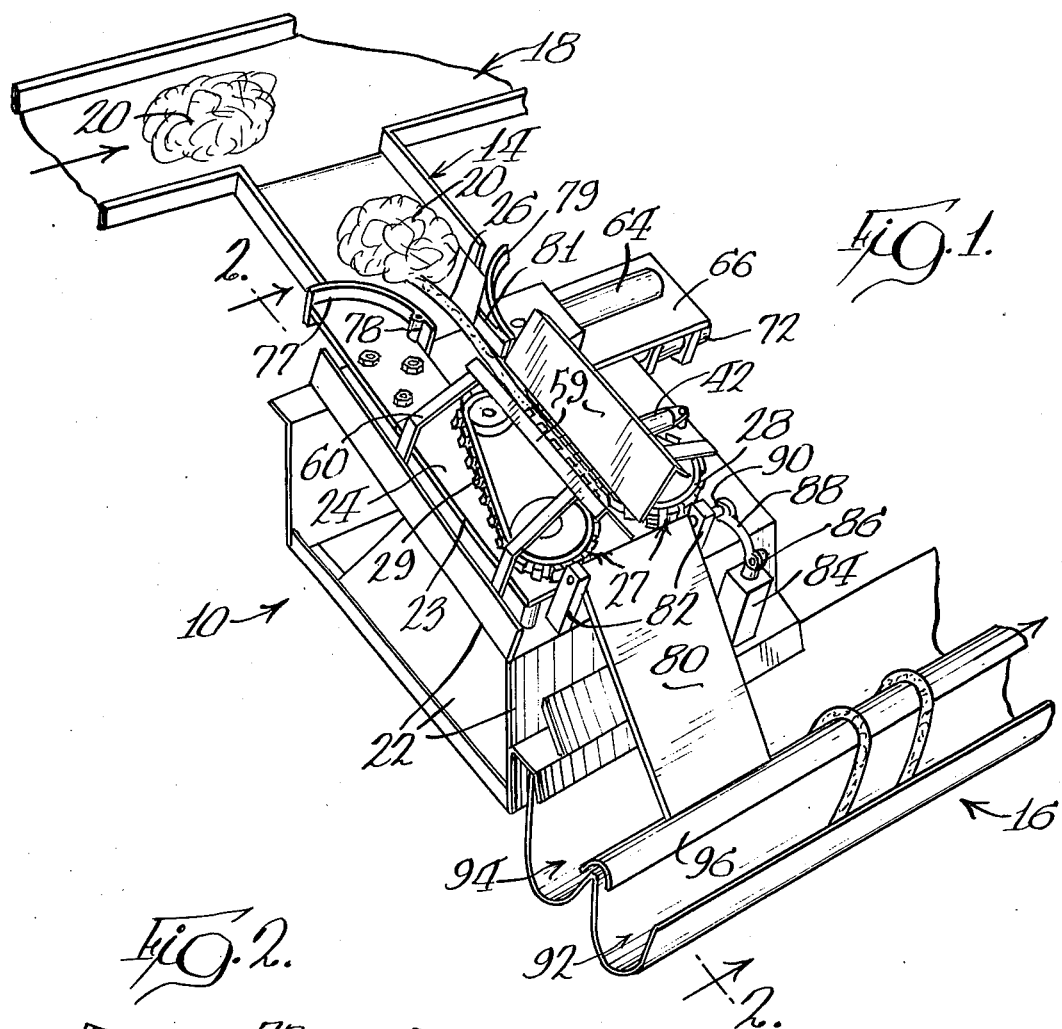
FIG. 1 is a perspective view from the exit end of the apparatus of this invention showing a casting set support table and feed conveyor on the entrance end and a pulled intestine strand collection transfer conveyor on the exit end.

While this invention is susceptible of embodiment in many different forms, there is shown in the drawings and will herein be described in detail a preferred embodiment of the invention, with the understanding that the present disclosure is to be considered as an exemplification of the principles of the invention and is not intended to limit the invention to the embodiment illustrated. The scope of the invention will be pointed out in the appended claims.

For ease of description, the apparatus of this invention will be described in normal operating position and terms such as upper, lower, horizontal, etc., will be used with reference to this normal operating position. It will be understood, however, that apparatus of this invention may be manufactured, stored, transported and sold in orientations other than normal operating position described.

The intestine pulling apparatus of this invention is generally designated by reference numeral 10 in FIG. 1. The apparatus 10 is shown located between a front table 14 and a rear collection transfer conveyor 16. Front table 14 is adjacent feed conveyor 18 which receives casing sets that are placed thereon at an upstream work station. The casing sets are generally designated by reference numeral 20 in FIG. 1 and consist of the small intestine with the ruffle fat attached. The casing set is in the form of a coiled or convoluted bulk of intestine with the ruffle fat attached to the strand of intestine making up the convoluted bulk. The ruffle fat extends along the length of the strand of intestine, but is attached to only a portion of the circumference of the round wall of the strand of intestine.

The apparatus 10 comprises a frame portion 22 which supports a top member 23 having a downwardly inclined, upwardly facing work surface 24. The top member 23 is a substantially flat plate running the length of the apparatus 10 and is preferably constructed of stainless steel plate.

The mid-portion of surface 24 defines a path 25 extending the length of the apparatus for carrying a strand 26 of the casing set 20 as it is pulled from the entrance end at table 14 to the exit end at conveyor 16. The path is defined, in part, by a pair of opposed gripping members 27 disposed in spaced parallel relationship above surface 24. The gripping members 27 comprise a pivotally movable gripping belt 28 and a stationary gripping belt 29 as best seen in FIG. 3. A drive sprocket 30 and an idler sprocket 31 are provided parallel to work surface 24 and around which pivotably movable gripping belt 28 is trained. Similarly, a drive sprocket 32 and an idler sprocket 33 are provided parallel to work surface 24 and around which stationary gripping belt 29 is trained. The drive sprockets 30 and 32 are located near the forward, or entrance end of the apparatus 10 and the idler sprockets 31 and 33 are located near the exit end of the apparatus 10.

To accommodate a pivoting movement of belt 28 as will hereinafter be described, a roller 34 is disposed between drive sprocket 30 and idler sprocket 31 in the one movable gripping belt 28. Roller 34 bears against the inner driven surface of the one movable gripping belt 28 to align a portion of the gripping belt parallel to, and adjacent, a portion of the other opposed stationary gripping belt 29.

Each gripping belt 28 and 29, is an articulated chain linked segmental band of arcuate, crescent-shaped gripping fingers 36 as shown in cross-section in FIG. 5. Strand 26 can be disposed in the path between the two gripping belts 28 and 29, and is compressively engaged by the arcuate gripping fingers 36 above work surface 24 as illustrated in FIG. 5.

As illustrated in FIGS. 3 and 4, the one movable gripping belt 28 is mounted above a pivot plate 38 for being moved from (1) a clearance position, spaced from the path 25 to enable the leading end of the intestine strand 26 to be manually placed in the path, and (2) a gripping position adjacent the path wherein the gripping fingers 36 apply a compressive gripping force to the portion of the intestine strand 26 disposed therebetween. The movable gripping belt 28 is mounted above pivot plate 38 on idler sprocket 32 and roller 34 which, in turn, are each rotatably mounted to pivot plate 38. Pivot plate 38 is pivotally mounted about the shaft 40 of drive sprocket 30 beneath top member 23. Idler sprocket 31 and roller 34 are mounted on, and rotate about, shafts 46 and 48, respectively, which pass through top member 23 and work surface 24. To accommodate the pivotal movement of the pivot plate 38, slots 50 and 52 are provided in top member 23 and accommodate the travel of shafts 46 and 48, respectively. The pivot plate 38 is moved between the clearance and engaging positions by air cylinder 42 which is connected to the pivot plate 38 by rod 44. Air cylinder 42 is actuated by appropriate pneumatic valve control means (not shown). FIG. 3 shows the movable belt 28 in the engaging position.

Figure 6:
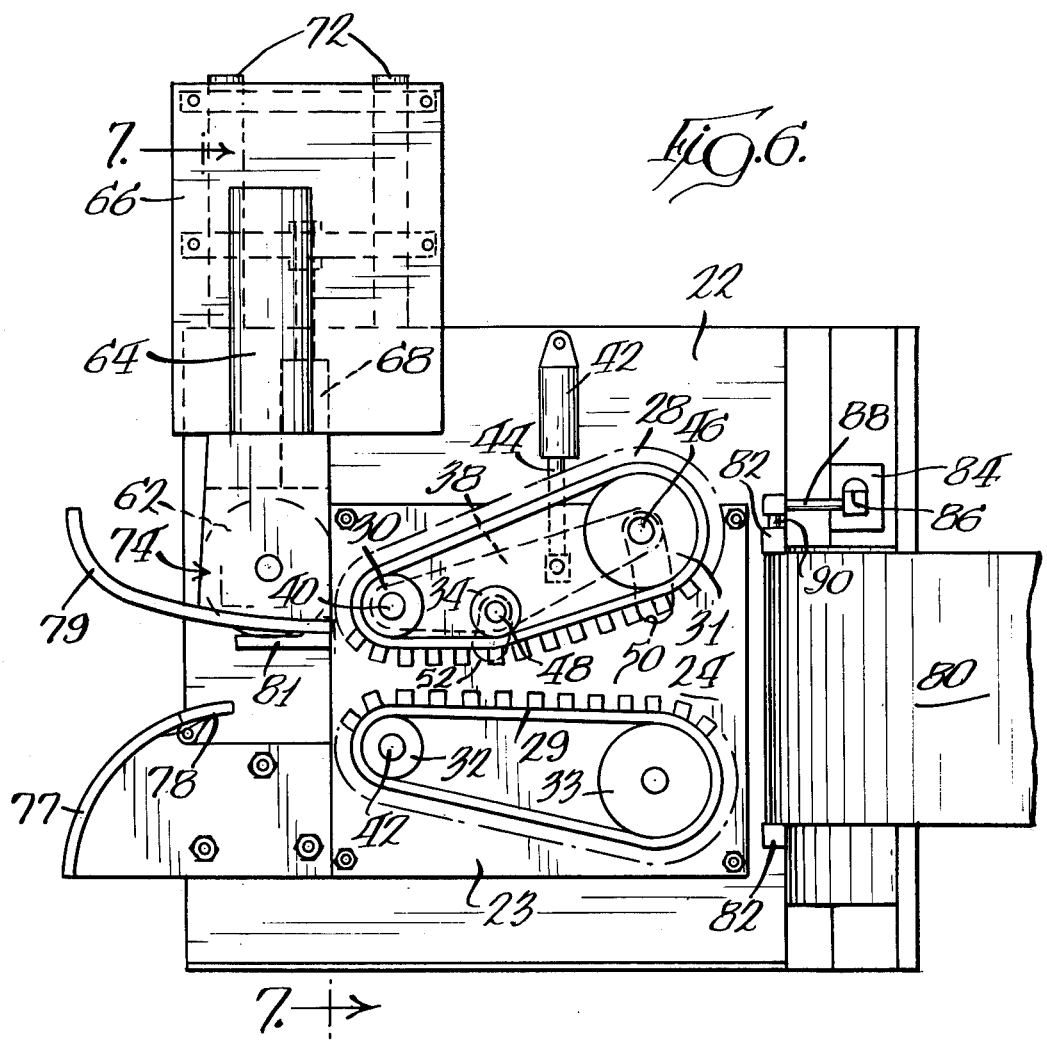
FIG. 6 is a plan view of the apparatus similar to FIG. 3 but showing one of the gripping belts moved to a clearance position.

Referring to FIG. 6, the movable gripping belt 28 is shown moved to the clearance position wherein pivot plate 38 has been pivoted outwardly and away from the stationary gripping belt 29 to enable the leading end of a strand of intestine (not shown) to be manually placed therebetween.

Figure 2:
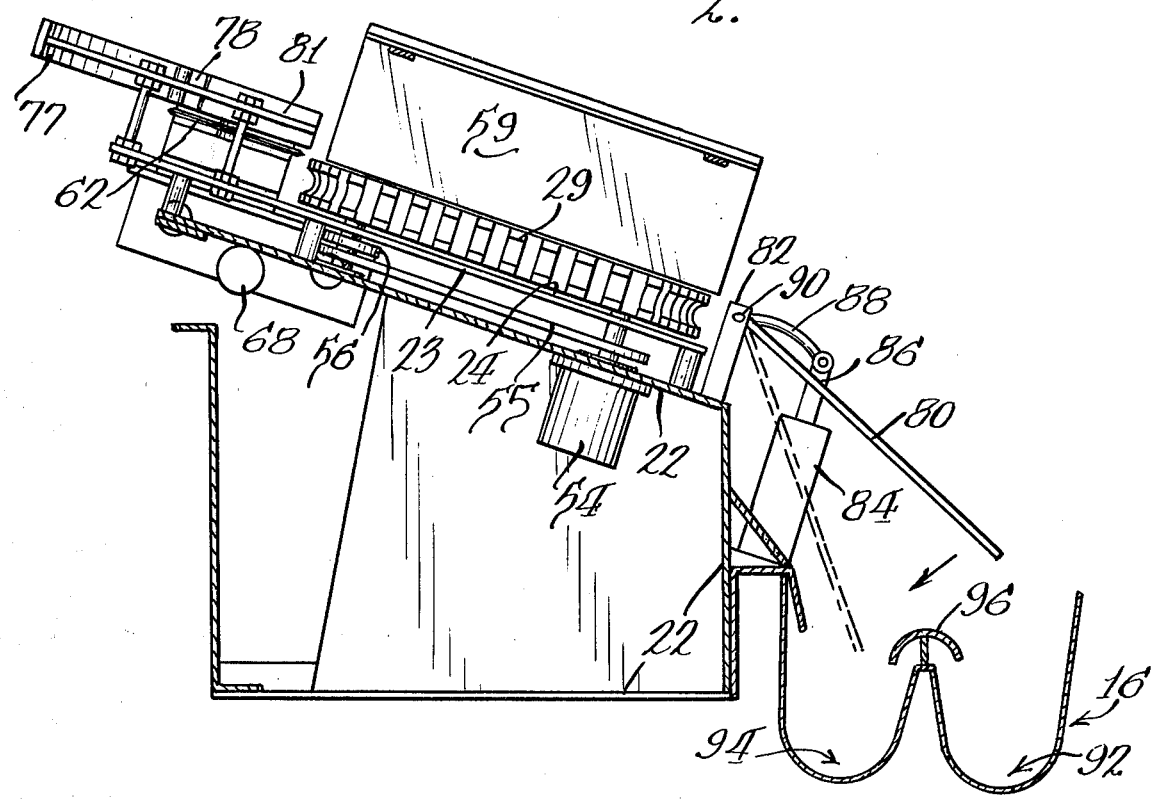
FIG. 2 is a cross-section view taken generally along the plane 2—2 of FIG. 1.
Figure 7:
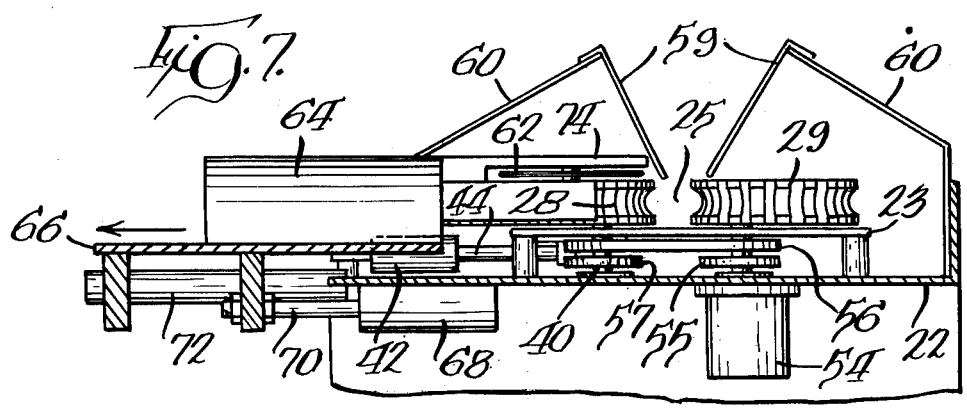
FIG. 7 is a cross-section view of the apparatus generally taken along the plane 7—7 in FIG. 6.

Referring now to FIGS. 2, 4, and 7, air motor 54 is provided below frame 22 for driving the gripping belts 28 and 29 through drive belts 55, 56, and 57. A variety of arrangements can be used to directly drive on idler sprocket (31 or 33) or one drive sprocket (30 or 32) with connected drive belts to some or all of the remaining sprockets.

Protection of personnel from the moving parts of the gripping belt assembly is provided by inclined guide plates 59 which are supported by members 60. Guide plates 59 further serve to effect proper placement of the leading end of strand 26 within path 25 between the opposed pair of gripping belts 28 and 29 during the initial loading.

For removing the ruffle fat from the portion of the circumference of the intestine strand 26 to which it is attached, a circular cutting knife 62 is provided at the front end or entrance to the apparatus. Circular cutting knife 62 is mounted parallel to working surface 24. As shown in FIG. 4, the circular cutting knife 62 is disposed above path 25 and the periphery of the circular knife 62 extends over path 25. Circular cutting knife 62 has a blade which is serrated every 5/16 of an inch around its circumference. The blade is rotated in a counterclockwise direction as viewed in FIG. 3 by air motor 64. The direction of rotation of the circular cutting knife 62 is thus in the direction tending to urge the intestine strand 26 forward along path 25. Circular cutting knife 62 and air motor 64 are mounted on movable plate 66 for reciprocal action perpendicular to the path 25. The circular knife is movable between (1) a loading, or clearance, position spaced from the path 25 to enable the leading end of the intestine strand 26 to be manually placed in path 25, and (2) an engaged cutting position, adjacent, and above, path 25. FIG. 6 shows cutting knife 62 moved to the loading or clearance position. The movement of cutting knife 62 is effected by air cylinder 68 acting on rod 70 which is secured to plate 66 as shown in FIG. 4. The actuation of air cylinder 68 is effected by conventional air control valve means (not shown). The support plate 66 rides on slide support rails 72 as it reciprocates between the clearance and cutting positions. As shown in FIG. 3, blade guard 74 extends above circular cutting knife 62 to protect the operator.

During the pulling operation, the gripping belts 28 are in compressive engagement about intestine strand 26. As illustrated in FIG. 4, the operator holds a portion of the ruffle fat 76 which is attached to the upper part of the circumference of the wall of the intestine strand 26. This portion of the ruffle fat is held above the intestine strand 26 and above the circular cutting knife 62. This action pulls a connecting portion of the ruffle fat membrane against the cutting edge of the circular cutting knife 62 wherein it is severed from the intestine strand 26.

Guide bars 77, 78, 79, and 81 are provided forward of the circular cutting knife 62, as illustrated in FIGS. 1 and 3, to provide for proper alignment of the intestine and ruffle fat with respect to the knife 62. Arcuate guide bar 79 and straight guide bar 81 are mounted on blade guard 74 for reciprocal movement with the guard 74 and knife 62. Arcuate guide bar 77 and pivotal guide bar 78 are mounted in fixed relationship above work surface 24 and do not reciprocate with knife 62. Pivotal guide bar 77 is a safety feature and is mounted to pivot away from knife 62 should an operator's hand be accidentally forced against it by movable guide bars 79 and 81 when the knife 62 moves from the clearance position to the cutting position.

Referring now to FIG. 1, a baffle plate 80 is shown pivotally mounted at the exit end of the apparatus to support blocks 82. As seen in FIG. 2, the front end of the baffle plate 80 is pivotally mounted to the mounting blocks 82 above the work surface 24 and above support path 25. Thus, as the intestine strand 26 exits from the exit end of the apparatus 10, the leading end of the strand 26 impinges upon the underside of baffle plate 80 and is deflected downwards towards the collection transfer conveyor 16. As illustrated in FIG. 2, baffle plate 80 is movable by air cylinder means 84 which is connected through rod 86 and linkage member 88 to shaft 90, supported in support blocks 82 and to which baffle plate 80 is secured.

As can be seen in FIG. 1 and FIG. 2, collection transfer conveyor 16 comprises an outer trough 92 and an inner trough 94. At the juncture between the inner and outer troughs 92 and 94 is moving member 96 which is moved in a direction parallel to the troughs by conventional means such as chain drives (not shown). When a strand of intestine 26 is pulled through the apparatus 10, the leading end impinges upon the underside of baffle plate 80 disposed in a first position and is directed downwards into outer trough 92. After a predetermined time, suitable conventional control means actuates air cylinder 84 to retract rod 86 thus rotating linkage member 88 and baffle plate 80 to a second position (shown dashed in FIG. 2) whereby the remaining trailing portion of the intestine strand 26 is directed to inner trough 94. This results in approximately one-half of the intestine strand 26 lying in the outer trough 92 and the other half of intestine strand 26 lying in the inner trough 94 with the middle portion being carried by moving member 96 as shown in FIG. 1.

During operation of the apparatus 10 to pull an intestine from a casing set, the following sequence occurs: the casing set 20 as shown in FIG. 1 is positioned on front table 14 at the front entrance of the apparatus 10 or is held by the operator at the front entrance of the apparatus 10. A loose end of the intestine of approximately 5 to 20 inches in length, with ruffle fat removed, is laid in between gripping belts 28 and 29 in path 25. Both the one movable gripping belt 28 and the circular cutting knife 62 have been moved away from the stationary gripping belt 28 to the loading or clearance position as shown in FIG. 6. If the casing set 20 is manually held, it is manually held by the ruffle fat portion with the ruffle fat portion above blade guard 74 as shown in FIG. 4. If the casing set 20 is supported on the front table 14, the operator grasps the ruffle fat portion and holds it above blade guard 74. The intestine strand 26 of the casing set 20 then hangs about one-half inch below the upper portion of the cutting edge of the air driven circular knife 62. A foot pedal (not shown) is used to start the apparatus 10 by actuating the cylinders 42 and 68 which hold the movable gripping belt 28 and the circular knife 62, respectively, in the loading, or clearance positions. Actuation of the foot pedal releases air from the air cylinders and allows the spring biasing mechanisms in the cylinders to urge the one movable belt 28 and circular knife 62 to the engaging and cutting positions, respectively. Operation of the foot pedal also starts the circular cutting knife air motor 64 and the gripping belt drive motor 54. The gripping belts 28 and 29, being then in compressive engagement around the leading end of the intestine strand 26, begin pulling the intestine strand 26 past the circular knife 62, through the belts, and into the collection transfer conveyor 16. The circular knife 62 severs the ruffle fat from the intestine strand 26 as it is being pulled.

By appropriate means, it is desirable to allow the intestine strand 26 to slip relative to the movement of the gripping belts 28 and 29 should a predetermined pulling force be exceeded. This will prevent rupture or other damage to the intestine strand 26. Slight adjustment of the position of, or manner of restraining and holding, the casing set by the operator will usually reorient the convolutions of the casing set so that the strand 26 will continue to be pulled at a force less than the predetermined force. The limited pulling force can be achieved by limiting the amount of compressive engagement applied by the gripping belts 28 and 29 to the wall of the intestine strand 26. This is accomplished by spring biasing one or both of the gripping belts. A spring biasing mechanism can be of the conventional type within the pivot plate air cylinder 42 or can be a separate external spring attached to the pivot plate 38. The spring biasing mechanisms can be adjustable.

It is desirable to apply the compressive engagement force of the gripping belts over a length of segment of the intestine strand 26 to avoid point contact that would rupture or otherwise damage the intestine strand. In the preferred embodiment, about 6 inches of linear contact on each side of intestine strand 26 is provided by gripping belts 28 and 29. The use of elastomeric gripping fingers on the gripping belts is desirable since it prevents damage to the intestine strand.

The speed of the drive belts is desirably adjustable and is preferably adjustable from between 60 to 600 feet per minute. With the gripping belts running at 600 feet per minute, it takes approximately four seconds to pull a 70 foot length of small intestine. It has been found that with the preferred embodiment illustrated herein, one man can pull about eight small intestine casing sets per minute, inclusive of the loading time.

The speed of the air motor driven circular cutting knife blade 62 is also adjustable by conventional air regulating valve means.

The edge of the cutting blade 62 moves in the same direction as the intestine strand 26 being pulled through the gripping belts 28 and 29. This helps to push the intestine strand forward. The circular knife 62 is rotating as it moves into its full severing position. It reaches its engaged severing position before the one movable gripping belt 28 reaches its complete compressive engaging position. This provides an initial severance of the ruffle fat. The belts 28 and 29 are also rotating as the one movable belt is brought into the gripping position to provide a somewhat gradual acceleration of the strand 26 as the strand becomes increasingly compressively engaged.

Thus, it is seen that the apparatus of this invention and the method disclosed herein, are able to afford efficient means for pulling a strand of intestine from a convoluted casing set. The use of an open-sided pair of opposing gripping belts permits rapid placement of the free, leading end of the intestine strand into the apparatus. No complex threading is required. Further, use of elastomeric gripping belts that are adjustably spring-biased permits appropriate pressure to be exerted upon a segment of intestine strand to avoid point contact which could lead to rupture or other damage. The use of the spring-biased compressive engagement permits the intestine strand to slip relative to the gripping belts when a predetermined pulling force is reached, thus providing assurance that the intestine strand will not be ruptured or otherwise damaged. Use of a circular cutting knife with a cutting edge rotating parallel to, and in the same direction, as the pulled intestine strand decreases the risk of severing a portion of the intestine strand wall and further promotes pushing of the intestine strand through the apparatus. The novel use of a baffle deflecting plate increases the efficiency of the whole pulling operation of eliminating any handling of the intestine strand after it has passed through the gripping belts of the apparatus.

From the foregoing, it will be observed that numerous other variations and modifications and rearrangements of parts may be effected without departing from the true spirit and scope of this invention. It is, of course, intended to cover by the appended claims all such modifications as fall within the scope of the claims.

We claim:

1. The method of pulling a strand of intestine from a convoluted intestine, as removed from an animal, comprising: manually separating the leading end of the intestine from the remainder of the convoluted intestine and placing the leading end between a pair of spaced gripping members; manually holding and restraining the remainder of the convoluted intestine; effecting relative movement between said gripping members so that said gripping members compressively engage opposite sides of said intestine; moving said gripping members in a direction away from said convoluted intestine while continuing to support and restrain the remainder of the convoluted intestine, whereby a strand of intesting is progressively pulled; progressively pulling the trailing end of said strand of intestine between said gripping members, directing said leading end over a conveyor means and into a first trough parallel to, and adjacent, one side of said conveyor means; and directing said trailing end into a second trough parallel to, and adjacent, the other side of said conveyor means, whereby a portion of the intestine strand between said leading end and said trailing end lies on said conveyor means.

2. A method as defined in claim 1, in which said step of manually separating the leading end of the intestine from the remainder of the convoluted intestine includes pulling one end outwardly from the convoluted intestine for a distance of from about 5 to 20 inches.

3. A method as defined in claim 1, in which said pair of gripping members is a pair of opposed, gripping belts, each belt being disposed about at least one drive sprocket and at least one idler sprocket, and in which the step of moving said gripping members includes drivably rotating each said drive sprocket to rotate each said gripping belt.

4. A method as defined in claim 3, in which one of the gripping belts is displaced toward the other gripping belt to effect said relative movement therebetween so that the gripping belts compressively engage opposite sides of said intestine strand.

5. A method as defined in claim 4 including the further step of maintaining a predetermined maximum force of compressive engagement on said intestine strand by said gripping belts.

6. A method as defined in claim 5, including the further step of effecting relative slipping movement between said gripping belts and said intestine strand when said predetermined maximum force is insufficient to effect further pulling of said strand from the remainder of said convoluted intestine.

7. The method of pulling a strand of intestine from a casing set of convoluted small intestine with ruffle fat attached, as removed from an animal, comprising: manually separating the leading end of the intestine from the casing set; placing said leading end below a cutting knife and between a pair of spaced gripping members; manually holding and restraining the remainder of the casing set by a portion of the ruffle fat; effecting relative movement between said gripping members so that said gripping members compressively engage opposite sides of said intestine; moving said gripping members in a direction away from said casing set while continuing to support and restrain the remainder of the casing set, whereby a strand of intestine is progressively pulled; supporting said strand on a portion of its circumference; and holding a portion of said ruffle fat away from said supported portion of said strand and against said cutting knife as said strand is being pulled, to thereby sever the ruffle fat from the strand.

8. A method as defined in claim 7, in which said step of manually separating the leading end of the intestine from the remainder of the convoluted intestine includes pulling one end outwardly from the convoluted intestine for a distance of from about 5 to 20 inches.

9. A method in accordance with claim 7 in which said cutting knife is a circular blade and including the further step of rotating the circular blade in the direction of movement of said strand.

10. A method as defined in claim 7, in which said pair of gripping members is a pair of opposed gripping belts, each belt being disposed about at least one drive sprocket and at least one idler sprocket, and in which the step of moving said gripping members includes drivably rotating each said drive wheel to rotate each said gripping belt.

11. A method as defined in claim 10, in which one of the gripping belts is displaced toward the other gripping belt to effect said relative movement therebetween so that the gripping belts compressively engage opposite sides of said intestine strand.

12. A method as defined in claim 1, including the further step of maintaining a predetermined maximum force of compressive engagement on said intestine strand by said gripping belts.

13. A method as defined in claim 12, including the further step of effecting relative slipping movement between said gripping belts and said intestine strand when said predetermined maximum force is insufficient to effect further pulling of said strand from the remainder of said convoluted intestine.

14. A method as defined in claim 12, including the further steps of progressively pulling the trailing end of said strand of intestine between said gripping belts, directing said leading end over a conveyor means and into a first trough parallel to, and adjacent, one side of said conveyor means, and directing said trailing end into a second trough parallel to, and adjacent, the other side of said conveyor means, whereby a middle portion of the intestine strand between said leading end and said trailing end lies on said conveyor means.

15. Apparatus for separating animal intestine from a convoluted state, as removed from the body of an animal, into a single strand comprising: means defining a work surface inclined downwardly from an entrance end to an exit end; first and second intestine strand gripping members disposed above said work surface in proximity thereto and collectively defining therebetween a path along which an intestine strand may travel; means mounting at least one of said gripping members for movement between (1) a clearance position spaced from said path to enable the leading end of said intestine to be manually placed in said path, and (2) a gripping position adjacent said path wherein each gripping member applies a compressive gripping force to the portion of the intestine strand disposed therebetween; means for driving said gripping members from said entrance end toward said exit end whereby a strand of intestine gripped between said gripping members is progressively pulled and withdrawn from the convoluted intestine as the remainder of the convoluted intestine is held and restrained conveyor means adjacent the exit end of said work surface; a baffle plate pivotally mounted above said path at said exit end; and means for pivoting said baffle plate against said strand of intestine to contral the trajectory of the strand as it passes from the exit end and dispose the strand on said conveyor means.

16. The apparatus in accordance with claim 15 in which said gripping members are a pair of opposed gripping belts, each mounted in a plane parallel to said work surface for rotation in said plane.

17. The apparauts in accordance with claim 16 including a first idler sprocket and a first drive sprocket about which one of said gripping belts is trained and including a second idler sprocket and a second drive sprocket about which the other of said gripping belts is trained.

18. The apparatus in accordance with claim 17 in which said first drive sprocket and said first idler sprocket of one of said gripping belts are oriented to align one side of the loop of said one gripping belt parallel to said path, in which a roller is mounted between said second drive sprocket and said second idler sprocket of the other of said gripping belts to bear against the inner driven surface of said other gripping belt to align a first portion of said other gripping belt at an angle with respect to said path and to align a second portion of said other gripping belt parallel to said path when the gripping belt is in said gripping position; and in which said roller and said second idler sprocket are each mounted on a common pivotal support plate for being pivoted to move said other gripping belt between said gripping position and said clearance position.

19. The apparatus in accordance with claim 18 in which each said gripping belt comprises an articulated band of arcuate gripping fingers.

20. Apparatus for separating intestine from a casing set of convoluted small intestine with ruffle fat attached, as removed from the body of an animal, into a single strand comprising: means defining a work surface inclined downwardly from an entrance end to an exit end; first and second intestine strand gripping members disposed above said work surface in proximity thereto and collectively defining therebetween a path along which an intestine strand may travel; means mounting at least one of said gripping members for movement between (1) a clearance position spaced from said path to enable the leading end of said intestine to be manually placed in said path, and (2) a gripping position adjacent said path, wherein each gripping member applies a compressive gripping force to the portion of the intestine strand disposed therebetween; means for driving said gripping members from said entrance end toward said exit end whereby a strand of intestine gripped between said gripping members is progressively pulled and withdrawn from the convoluted intestine as the remainder of the convoluted intestine is held and restrained, and cutter means for severing said ruffle fat from said strand of intestine as said strand is pulled, said cutter means being mounted above said path at said entrance end and adapted for movement perpendicular to said path.

21. The apparatus in accordance with claim 20 including a baffle plate pivotally mounted above said path at said exit end of said work surface and means for pivoting said baffle plate against said strand of intestine to control the trajectory and disposition of the strand of intestine as it passes from said exit end.

22. The apparatus in accordance with claim 20 in which said cutter means comprises a circular knife blade.

23. The apparatus in accordance with claim 22 in which said circular knife blade is mounted in a plane parallel to said work surface at said entrance end forward of said gripping members.

24. The apparatus in accordance with claim 23 including a positioning means for moving said circular knife blade between (1) a loading position spaced from said path to enable the leading end of said intestine to be manually placed in said path, and (2) a cutting position above said path whereby the ruffle fat can be severed from the strand of intestine as the strand is pulled in the path below the circular knife with an upper portion of the ruffle fat being held above said circular knife to thereby urge against the circular knife the lower portion of the ruffle fat connected to said strand of intestine.

25. The apparatus in accordance with claim 20 in which said gripping members are a pair of opposed gripping belts, each mounted in a plane parallel to said work surface for rotation in said plane.

26. The apparatus in accordance with claim 25 including a first idler sprocket and a first drive sprocket about which one of said gripping belts is trained and including a second idler sprocket and a second drive sprocket about which the other of said gripping belts is trained.

27. The apparatus in accordance with claim 26 in which said first drive sprocket and said first idler sprocket of one of said gripping belts are oriented to align one side of the loop of said one gripping belt parallel to said path; in which a roller is mounted between said second drive sprocket and said second idler sprocket of the other of said gripping belts to bear against the inner driven surface of said other gripping belt to align a first portion of said other gripping belt at an angle with respect to said path and to align a second portion of said other gripping belt parallel to said path when the gripping belt is in said gripping position; and in which said roller and said second idler sprocket are each mounted on a common pivotal support plate for being pivoted to move said other gripping belt between said gripping position and said clearance position.

28. The apparatus in accordance with claim 27 in which each said gripping belt comprises an articulated band of arcuate gripping fingers.

* * * * *

UNITED STATES PATENT AND TRADEMARK OFFICE
CERTIFICATE OF CORRECTION

PATENT NO. : 4,063,331
DATED : December 20, 1977
INVENTOR(S) : Leo E. O'Neal et al.

It is certified that error appears in the above-identified patent and that said Letters Patent are hereby corrected as shown below:

Column 4, line 65 "on" should be -- one --.

Column 8, line 2 first "of" should be -- by --.

Claim 12, line 1 "claim 1" should be -- claim 11 --.

Signed and Sealed this

Twenty-third Day of May 1978

[SEAL]

Attest:

RUTH C. MASON
Attesting Officer

LUTRELLE F. PARKER
Acting Commissioner of Patents and Trademarks